(12) United States Patent
Takano et al.

(10) Patent No.: US 9,996,093 B2
(45) Date of Patent: Jun. 12, 2018

(54) SEMICONDUCTOR INTEGRATED CIRCUIT FOR REGULATOR, WHICH DETECTS ABNORMALITIES IN A CONNECTED LOAD

(71) Applicants: Yoichi Takano, Tama (JP); Shinichiro Maki, Tama (JP)

(72) Inventors: Yoichi Takano, Tama (JP); Shinichiro Maki, Tama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 16 days.

(21) Appl. No.: 15/238,809

(22) Filed: Aug. 17, 2016

(65) Prior Publication Data

US 2017/0063232 A1    Mar. 2, 2017

(30) Foreign Application Priority Data

Aug. 24, 2015  (JP) .................................. 2015-164596

(51) Int. Cl.
*H02M 3/158*  (2006.01)
*G05F 1/56*  (2006.01)

(52) U.S. Cl.
CPC .............. *G05F 1/56* (2013.01); *H02M 3/158* (2013.01)

(58) Field of Classification Search
None
See application file for complete search history.

(56) References Cited

U.S. PATENT DOCUMENTS

| 2008/0001672 A1* | 1/2008 | Shih | G05F 3/262 330/288 |
|---|---|---|---|
| 2014/0016425 A1* | 1/2014 | Lee | G05F 1/10 365/226 |
| 2014/0176112 A1* | 6/2014 | Chang | G05F 3/30 323/313 |
| 2016/0099644 A1 | 4/2016 | Tsuzaki | |

FOREIGN PATENT DOCUMENTS

JP    2012093296 A    5/2012
JP    2015005171 A    1/2015

* cited by examiner

*Primary Examiner* — Jeffrey Gblende
(74) *Attorney, Agent, or Firm* — Holtz, Holtz & Volek PC

(57) ABSTRACT

A semiconductor integrated circuit for a regulator includes the following: a voltage controlling transistor; a controlling circuit; a first and second transistor; a first external terminal to connect a current voltage converting element; a first and second voltage comparing circuit which compares a converted voltage with a predetermined comparison voltage and determines which is large or small; and a first and second output terminal which externally outputs a result of comparison by the first and second voltage comparing circuit, respectively. When a current larger than a predetermined open-circuit abnormality detecting current value flows in the first transistor, output of the first voltage comparing circuit is inverted. When a current larger than a predetermined short-circuit abnormality detecting current value flows in the second transistor, output of the second voltage comparing circuit is inverted.

4 Claims, 5 Drawing Sheets

SEMICONDUCTOR INTEGRATED CIRCUIT FOR REGULATOR, WHICH DETECTS ABNORMALITIES IN A CONNECTED LOAD

BACKGROUD OF THE INVENTION

Field of the Invention

The present invention relates to a technique useful to be used in a DC power supply apparatus and a semiconductor integrated circuit as a voltage regulator such as a series regulator which converts DC voltage (regulator IC).

Description of the Related Art

There is a series regulator (hereinafter simply referred to as regulator) as a power supply apparatus in which a transistor provided between a DC voltage input terminal and output terminal is controlled to output a DC voltage with a desired potential. An example of such regulator is a power supply apparatus to supply DC power supply to electronic devices in a vehicle (vehicle mounted regulator), such devices including a car navigator, an ETC device, an audio device, an antenna device and the like in a car.

As for such vehicle mounted regulator, the vehicle mounted electronic device such as the car navigator is connected to the regulator with a connector. Therefore, the connector may fall off due to the body of the car vibrating and the output. terminal of the power source may become open-circuit or a short-circuit may occur in the electronic device as the load. Therefore, a function to detect such abnormal state is desired in a vehicle mounted regulator. A function to prevent the main body apparatus breaking due to excessive current flowing when connected to a reception antenna such as GPS, VICS (registered trademark) and radio broadcasting is desired.

For example, as shown in FIG. 5, there is a technique to provide a resistor to detect current (sense resistor R1) in the input terminal side of the regulator to supply DC voltage from the battery through the sense resistor, and to provide a microcomputer for control to input the terminal voltage of the sense resistor so that the microcomputer can detect open-circuit and short-circuit of the output terminal of the regulator with software processing (for example, Japanese Patent Application Laid-Open Publication No. 2012-93296).

Further, there is also an invention to supply DC voltage from the battery through the sense resistor to the internal terminal of the regulator and to provide an excess current protection circuit including a comparator to compare the output of the amplifier amplifying the voltage between terminals of the sense resistor and the reference voltage. When the short-circuit occurs in the output terminal, the excess current protection circuit is used to control the transistor for output voltage control and to limit the current so that it is possible to prevent excess current (for example, Japanese Patent Application Laid-Open Publication No. 2015-5171).

According to the invention described in Japanese Patent Application Laid-Open Publication No. 2012-93296, the open-circuit and short-circuit of the output terminal of the regulator is determined by a microcomputer, and the burden on the microcomputer becomes heavy.

According to the invention described in Japanese Patent Application Laid-Open Publication No. 2012-93296 and Japanese Patent Application Laid-Open Publication No. 2015-51171, the sense resistor is provided in the input terminal of the regulator, and the current flowing to the output terminal is converted to voltage to detect the open-circuit and the short-circuit of the load connected to the output terminal. Therefore, excess power is lost in the sense resistor.

In order to reduce the power loss in the sense resistor, the detecting resistor may be set to a small value such as 1Ω, In this case, when the current value for open-circuit detecting is set to 10 mA and when the current value for short-circuit detecting is set to 200 mA, the detecting voltage is to be 10 mV and 200 mV, respectively. When the input offset voltage of the comparator which compares the detected voltage and the reference voltage is ±1 mV, the accuracy of detecting short-circuit abnormality is ±0.5% whereas the accuracy of detecting open-circuit abnormality is ±10%, and the detecting accuracy decreases.

SUMMARY OF THE INVENTION

The present invention was conceived in view of the above problems, and the object of the present invention is to be able to accurately detect abnormalities such as open-circuit and short-circuit in the load connected to the output terminal in the semiconductor integrated circuit composing a DC power supply apparatus such as a series regulator (regulator IC).

Another object of the present invention is to provide a regulator semiconductor integrated circuit (regulator IC) in which the current value to detect the abnormalities such as open-circuit and short-circuit in the load connected to the output terminal can be set freely according to the applied system.

In order to achieve at least one of the above-described objects, according to an aspect of the present invention, there is provided a semiconductor integrated circuit for a regulator including: a voltage controlling transistor which is connected between a voltage input terminal in which DC voltage is input and an output terminal; a controlling circuit which controls the voltage controlling transistor according to a feedback voltage of an output; a first transistor and a second transistor which are provided parallel to the voltage controlling transistor and in which a current in a proportional reduction from a current flowing in the voltage controlling transistor flows; a first external terminal to connect a current voltage converting element which converts current flowing in the first transistor to voltage; a first voltage comparing circuit which compares a voltage converted by the current voltage converting element with a predetermined comparison voltage and determines which is large or small; a second voltage comparing circuit which compares a voltage converted from a current flowing in the second transistor with a predetermined comparison voltage and determines which is large or small; a first output terminal which externally outputs a result of comparison by the first voltage comparing circuit; and a second output terminal which externally outputs a result of comparison by the second voltage comparing circuit, wherein, when a current larger than a predetermined open-circuit abnormality detecting current value flows in the first transistor, output of the first voltage comparing circuit is inverted; and when a current larger than a predetermined short-circuit abnormality detecting current value flows in the second transistor, output of the second voltage comparing circuit is inverted.

Preferably, the semiconductor integrated circuit for the regulator further includes a thermal shutdown circuit which detects a temperature of a semiconductor substrate forming the semiconductor integrated circuit and turns off the voltage controlling transistor with the controlling circuit when the temperature of the semiconductor substrate increases to a temperature equal to or larger than a predetermined temperature set in advance, wherein, a signal of a logical sum between an output of the thermal shutdown circuit and an output of the second voltage comparing circuit can be output from the second output terminal as a short-circuit abnormality detecting signal.

Preferably, the semiconductor integrated circuit for the regulator further includes a delay circuit which delays output of at least the second voltage comparing circuit among the output of the first voltage comparing circuit and the second voltage comparing circuit, wherein, a signal obtaining a logical product of an output signal of the second voltage comparing circuit and a signal delayed in the delay circuit can be output from the second output terminal as a short-circuit abnormality detecting signal.

Preferably, the semiconductor integrated circuit for the regulator further includes a second external terminal to connect a current voltage converting element to convert current flowing in the second transistor to voltage, wherein, the second voltage comparing circuit compares the voltage converted by the current voltage converting element connected to the second external terminal with a predetermined comparison voltage.

Preferably, the semiconductor integrated circuit for the regulator further includes a current limit circuit to limit an output current so that an output current equal to or more than a predetermined current value does not flow, wherein, the current limit circuit limits a current flowing in the voltage controlling transistor when the output current based on the output of the second voltage comparing circuit is equal to or more than a predetermined current value.

BRIEF DESCRIPTION OF THE DRAWINGS

The present invention will be described through the detailed description below and the accompanying drawings. Such description and drawings should not be construed to limit the present invention.

DESCRIPTION OF THE PREFERRED EMBODIMENTS

A preferable embodiment of the present invention is described based on drawings.

Figure 1:
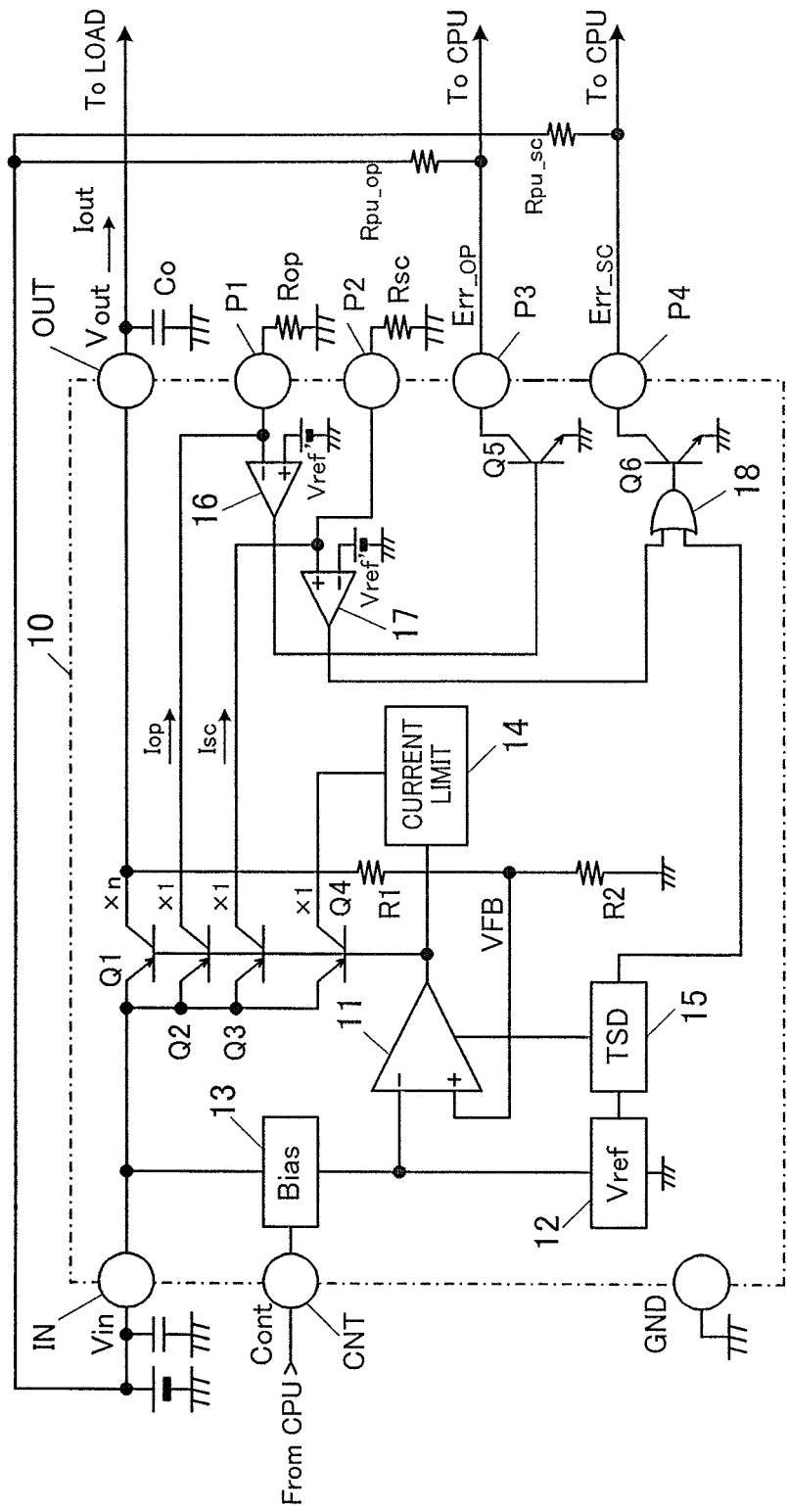
FIG. 1 is a diagram of a circuit configuration showing an embodiment of a series regulator IC applying the present invention.

FIG. 1 is a diagram showing an embodiment of a series regulator as a DC power supply apparatus employing the present invention. In FIG. 1, the portion surrounded by an alternate short and long dash line is formed as a semiconductor integrated circuit (regulator IC) 10 on a semiconductor chip such as mono-crystal silicon. The portion functions as a DC power supply apparatus in which a condenser Co is connected to an output terminal OUT of the regulator IC 10 to supply stable DC voltage.

As described in FIG. 1, in the regulator IC 10 of the present embodiment, a transistor Q1 to control voltage composed of a PNP bi-polar transistor is connected between the voltage input terminal IN where the DC voltage Vin is applied and output terminal OUT, and breeder resistors R1 and R2 are connected in a series between the output terminal OUT and a ground line where grounding potentials are applied to divide output voltage Vout, The voltage VFB divided by the breeder resistors R1 and R2 is fed back to a non-inverted input terminal of an error amplifier 11 as an error amplifier circuit controlling a base terminal of the voltage controlling transistor Q1. Then, the error amplifier 11 controls the voltage controlling transistor Q1 according to the difference in potential between the feedback voltage VFB of the output and a predetermined reference voltage Vref so that the output voltage Vout is to be a predetermined potential.

The regulator IC 10 of the present embodiment is provided with a reference voltage circuit 12 which generates reference voltage Vref applied to the inverted input terminal of the error amplifier 11, a bias circuit 13 which flows an operation current to the error amplifier 11 and to the reference voltage circuit 12, a current limit circuit 14 which is connected to the base terminal of the voltage controlling transistor Q1 and limits the output current, and a thermal shut down circuit 15 which stops operation of the error amplifier 11 and turns off the transistor Q1 when the temperature of the chip rises to a predetermined temperature or higher.

The reference voltage circuit 12 includes resistors and Zener diodes in series. The bias circuit 13 is provided with a function to supply and cut bias current to the error amplifier 11 according to the control signal Cont input to the external terminal CNT from the microcomputer (CPU) outside the chip. The current limit circuit 14 limits the output current by applying a clamp so that the base current does not become equal to or larger than a predetermined value when the output current increases and the output voltage decreases due to abnormalities in the load, and the error amplifier 11 lowers the base voltage so that more current flows in the transistor Q1.

In the regulator IC 10 of the present embodiment, bipolar transistors Q2, Q3, and Q4 are provided parallel to the voltage controlling transistor Q1 composing the current mirror circuit with the transistor Q1. Voltage the same as the voltage applied to the base terminal of the voltage controlling transistor Q1 is applied to the base terminal as the control terminal of the transistors Q2 to Q4. With this, the current (1/N current) in proportion with the collector current of Q1 flows in the transistors Q2 to Q4 according to the size ratio N of the elements. When the transistor Q1 is composed with N transistors in the same size connected in parallel and the transistors Q2 to Q4 are each composed of 1 transistor, the setting is performed so that the current flows in proportion with the number of elements.

The regulator IC 10 of the present embodiment is provided with an external terminal P1 to connect a resistor Rop for current-voltage conversion outside the chip and an external terminal P2 to connect resistor Rsc. The collector terminal of the current mirror transistor Q2 is connected to the external terminal P1 and the collector terminal of the current mirror transistor Q3 is connected to the external terminal P2. Further, an open-circuit abnormality detecting comparator 16 with the inverted input terminal connected to the external terminal P1 and the reference voltage Vref' applied to the non-inverted input terminal and a short-circuit abnormality detecting comparator 17 with the non-inverted input terminal connected to the external terminal P2 and the reference voltage Vref applied to the inverted input terminal are provided.

The resistance value of the external resistor Rop is set so that when the detecting current of the open-circuit abnormality such as 10 mA flows in the voltage controlling transistor Q1, the voltage between both terminals of the resistors becomes the same value as the reference voltage Vref'. The resistance value of the external resistor Rsc is set so that when the detecting current of the short-circuit abnormality such as 200 mA flows in the voltage controlling transistor Q1, the voltage between both terminals of the resistors becomes the same value as the reference voltage Vref'.

As described above, according to the present embodiment, the current value to detect open-circuit abnormality and short-circuit abnormality is set in the external resistors Rop and Rsc. Therefore, the detecting current value (threshold value) can be set freely according to the used system and the same voltage value can be used as the reference Vref' used in the comparators 16 and 17. Consequently, the circuit generating the reference voltage can be simplified.

The regulator IC 10 of the present embodiment is provided with a NPN transistor Q5 in which the output terminal of the comparator 16 is connected to the base terminal, a OR gate 18 in which the output of the comparator 17 and the output of the thermal shutdown circuit 15 are the input, and a NPN transistor Q6 in which the output terminal of the OR gate 18 is connected to the base terminal. In the regulator IC chip, external terminals P3 and P4 are provided to output a signal to the external CPU in an open collector format. The collector terminal of the transistor Q5 is connected to the external terminal P3, and the collector terminal of the transistor Q6 is connected to the external terminal P4.

Figure 2:
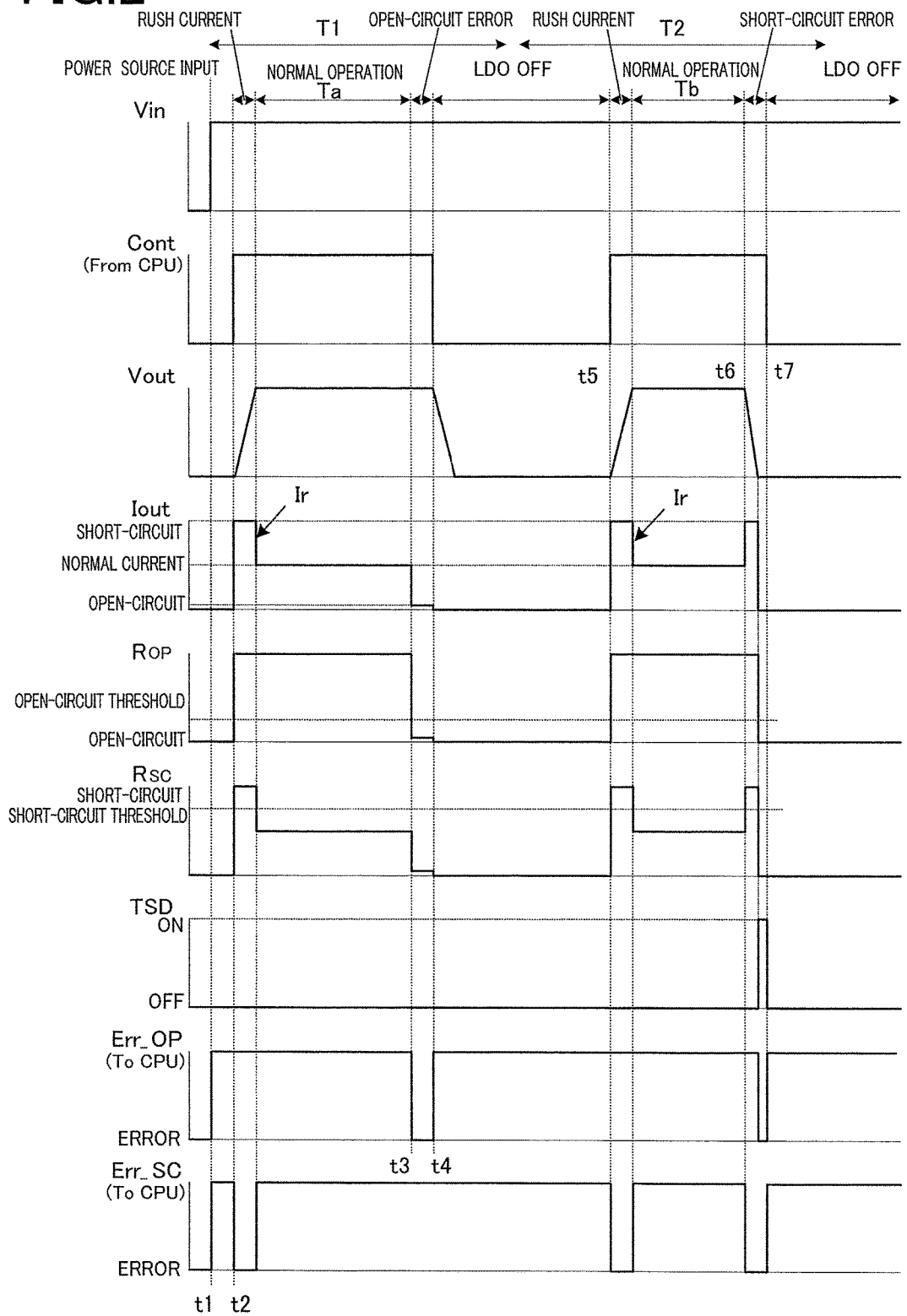
FIG. 2 is a timing chart showing change in voltage of each unit of the regulator according to the embodiment shown in FIG. 1.

Next, the operation of the regulator IC 10 of the present embodiment is described using the timing chart shown in FIG. 2. In FIG. 2, term T1 of the left half describes the timing when open-circuit occurred after normal operation continued for a certain period of time after operation of the regulator started, and term T2 of the right half describes timing when short-circuit occurred after normal operation continued for a certain period of time after operation of the regulator started.

As shown in FIG. 2, when the input voltage Vin rises at timing t1, and the signal Cant of the control terminal CNT is changed to a high level from the outside at timing t2, the regulator IC 10 starts operation and is controlled so that the output voltage Vout rises to a predetermined voltage. During the transition until the output voltage Vout rises, a rush current (entering current) flows into the condenser Co connected to the output terminal, and then steady current flows according to the state of the load (term Ta).

When there is an abnormality such as the open-circuit in the output terminal in the steady operation state, the output circuit Iout drastically decreases (timing t3). Then, since the current flowing in the current mirror transistor Q2 similarly decreases, the comparator 16 detects the above and the output changes to the high level. As a result, the transistor Q5 turns on and the signal Err-OP output from the external terminal P3 changes to a low level. The CPU receiving the signal is able to detect that the open-circuit abnormality occurred. When the CPU detects open-circuit abnormality, the control signal Cont is changed to the low level, and the operation of the regulator IC 10 stops (timing t4).

Then, when the open-circuit abnormality is solved and the control signal Cont changes to the high level at timing t5, the regulator IC 10 resumes operation, and the regulator IC 10 is controlled so that the output voltage Vout rises to a predetermined voltage. The rush current flows during the transition until the output voltage rises, and then the stable current flows according to the state of the load (term Tb).

Then, when a short-circuit occurs in the load in the steady operation state, the output current Iout drastically increases (timing t6). Then, since the current flowing in the current mirror transistor Q3 similarly increases, the comparator 17 detects the above and the output changes to the high level. As a result, the transistor Q6 is turned on, the signal Err-SC output from the external terminal P4 changes to the low level, and the CPU receiving the signal is able to detect that the short-circuit abnormality occurred.

When the short-circuit abnormality occurs, a large amount of power is generated as heat due to the drastic increase of the output current Iout, and since the thermal shutdown circuit stops the operation of the error amplifier 11 and turns off the transistor Q1 when the temperature of the chip increases to a predetermined temperature, the output current Iout is cut and the detection of the short-circuit state is canceled. When the heat is released, the semiconductor chip temperature decreases, and the shutdown is canceled. If the short-circuit state is maintained, the short-circuit state is detected and output, and this operation is repeated. With this, the short-circuit abnormality detecting signal does not operate properly.

Therefore, in the regulator IC 10 of the present embodiment, an OR gate 18 is provided to obtain the logical sum between the output of the comparator 17 and the output of the thermal shutdown circuit 15, and the transistor Q6 switches on and off with the output of the OR gate 18. With this, when the short-circuit abnormality occurs and the output current Iout drastically increases, the short-circuit abnormality detecting signal is output. In order to maintain the short-circuit abnormality detecting signal even while the chip temperature increases and the output of the thermal shutdown circuit detects the high temperature, it is possible to prevent the short-circuit abnormality detecting signal of the regulator IC 10 from repeating the above operation by the transistor Q6 switching between on and off according to the logical sum between the output of the comparator 17 and the output of the thermal shutdown circuit 15. When the CPU detects the short-circuit abnormality, the control signal Cant is changed to the low level and the operation of the regulator IC 10 stops (timing t7).

As described above, according to the regulator IC 10 of the present embodiment, the rush current flows soon after the regulator IC 10 starts operation, the rush current changes the output of the comparator 17 to the high level, the transistor Q6 is turned on, and the Err-SC is changed to the low level. The erroneous detection signal can be handled by executing a dead zone program in the CPU to perform a process which ignores the short-circuit detecting pulse soon after turning on the power.

(Modification)

Next, the modification of the regulator IC of the above embodiment is described with reference to FIG. 3 and FIG. 4.

Figure 3:
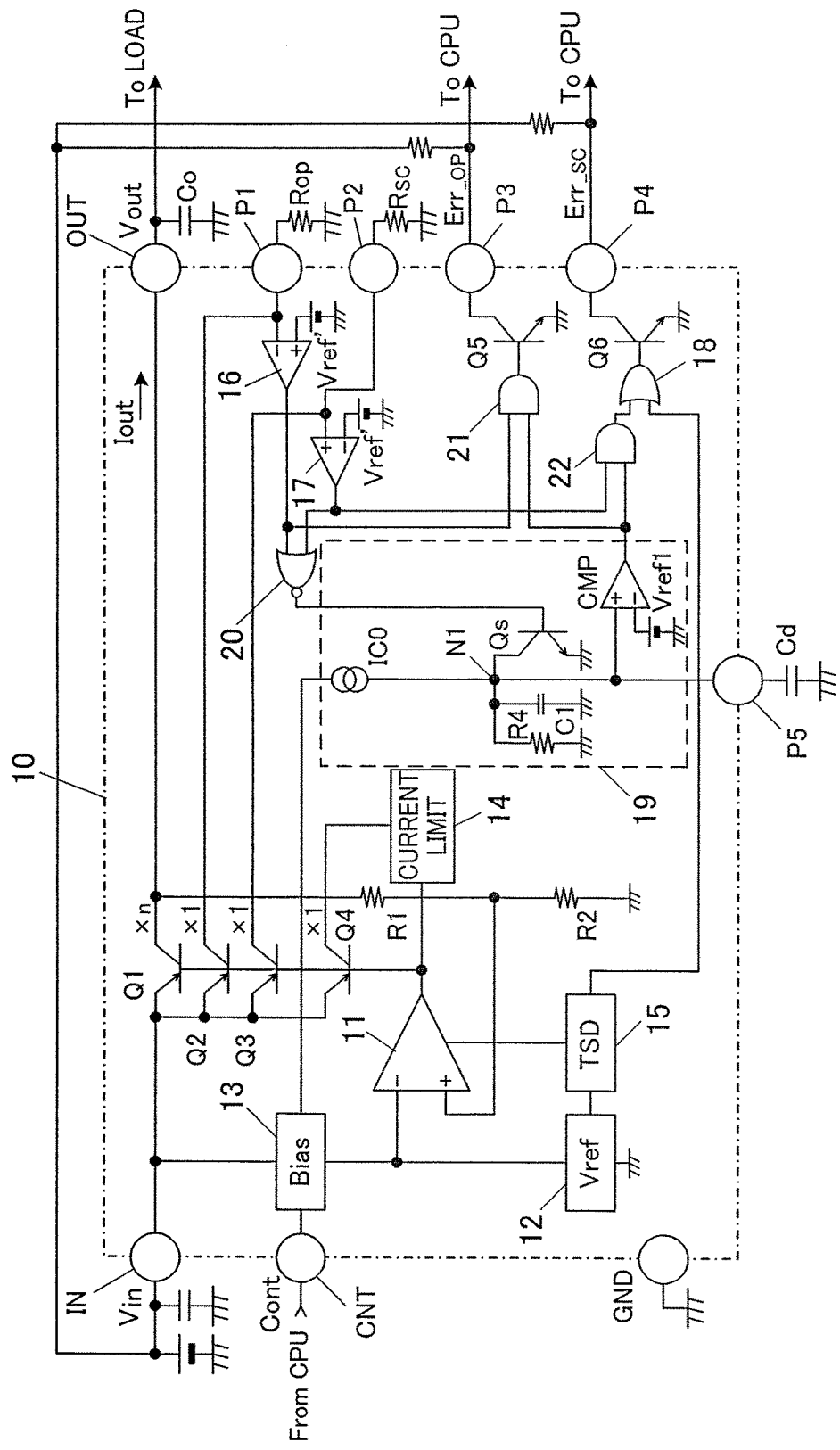
FIG. 3 is a diagram of a circuit configuration showing a first modification of the regulator according to the embodiment shown in FIG. 1.

FIG. 3 shows a regulator IC of a first modification. According to this modification, in order to prevent the erroneous detection signal due to the rush current, the regulator IC 10 is provided with a delay circuit 19 including a resistor and capacity to delay the output of the comparators 16 and 17, a NOR gate 20 to obtain the logical sum of the output of the comparators 16 and 17 and to input the result to the delay circuit 19, and AND gates 21 and 22 to obtain a logical product between the output of the delay circuit 19 and the output of the comparators 16 and 17 before delay.

The regulator IC of the above embodiment determines the short-circuit state occurred when a comparatively large current flows toward the output terminal. When the IC is started, a relatively large rush current (entering current) flows toward the condenser Co of the output terminal. With the regulator IC described in FIG. 1, the rush current and the current flowing toward the output terminal when the short-circuit abnormality occurs cannot be discriminated. Therefore, as shown in the timing chart in FIG. 2, it is not possible to avoid the erroneous detecting pulse in the output of the comparator 17 due to detecting the rush current Ir.

Turning to the system using the regulator IC of the present modification, the system employs a configuration in which the erroneous detection signal is not output when the rush current is detected. Therefore, the advantage is that the dead zone program to be used later does not need to be provided in the CPU.

Specifically, the delay circuit 19 includes a constant current source IC0 and a capacitor C1 charged with the constant current source IC0; a resistor R4 connected in series between the grounding point and the connecting node N1 between the constant current source IC0 and the capacitor C1 and the switch transistor Qs; and a comparator CMP. The output voltage of the NOR gate 20 is input to the base terminal of the transistor Qs. The external terminal P5 connected to the connecting node N1 is also provided, and the delay time can be made larger without increasing the chip size by connecting the external capacity Cd to the terminal PS.

In the normal operation state when the output of both comparators 16 and 17 are at the low level, the delay circuit 19 is in an on state with the high level applied to the base terminal of the transistor Qs due to the output of the NOR gate 20 and the capacitors C1 and Cd are in a discharged state. When the comparator 16 detects an open-circuit state or the comparator 17 detects a short-circuit state, and the output of either one of the comparators changes to the high level, the output of the NOR gate 20 changes to the low level and the transistor Qs is turned off.

The capacitors C1 and Cd are gradually charged and the potential of the connecting node N1 gradually increases. The output of the comparator CMP changes from the low level to the high level when a predetermined amount of time passes and the potential of the connecting node N1 becomes higher than the reference voltage Vref1 of the comparator CMP. With this, when the open-circuit state is detected, the output of the AND gate 21 changes to the high level, the transistor Q5 is turned on, and the external terminal P3 changes from the high level to the low level.

When the short-circuit abnormality is detected, the output of the AND gate 22 is changed to the high level, the transistor Q6 is turned on, and the external terminal P4 changes from the high level to the low level. The delay time of the delay circuit 19 is set to an amount of time slightly longer than the term that the rush current Ir flows as shown in FIG. 2.

According to the present modification, since the above-described delay circuit 19, the comparator CMP, and the AND gates 21 and 22 are provided, the erroneous detecting pulse is not emitted when the rush current is detected.

FIG. 3 shows a configuration in which the delay circuit 19 delays each output of the comparators 16 and 17, but alternatively, only the output of the comparator 17 for detecting short-circuit abnormality can be delayed. In this case, the NOR gate 20 and the AND gate 21 shown in FIG. 3 are not necessary.

Figure 4:
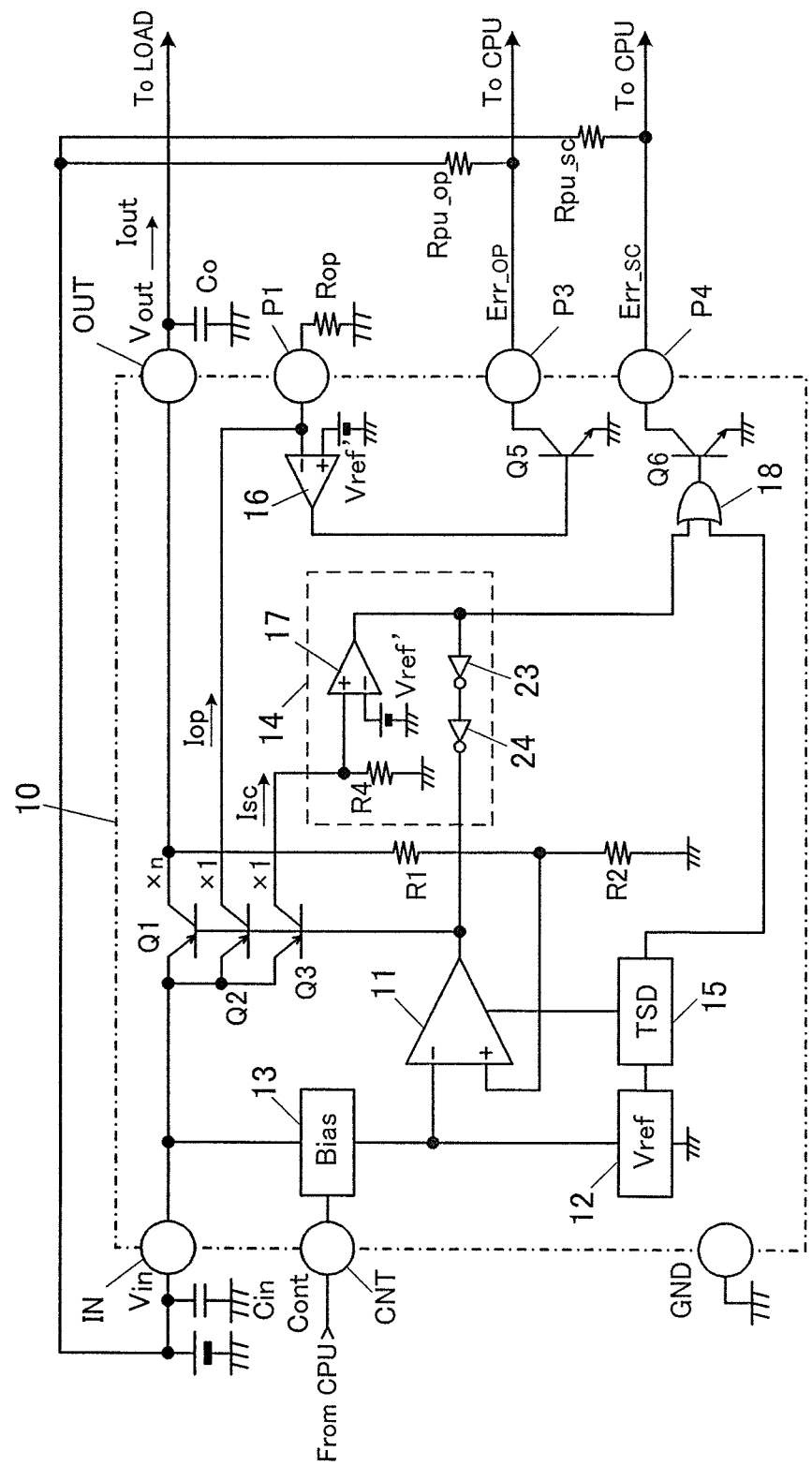
FIG. 4 is a diagram of a circuit configuration showing a second modification of the regulator according to the embodiment shown in FIG. 1.
Figure 5:
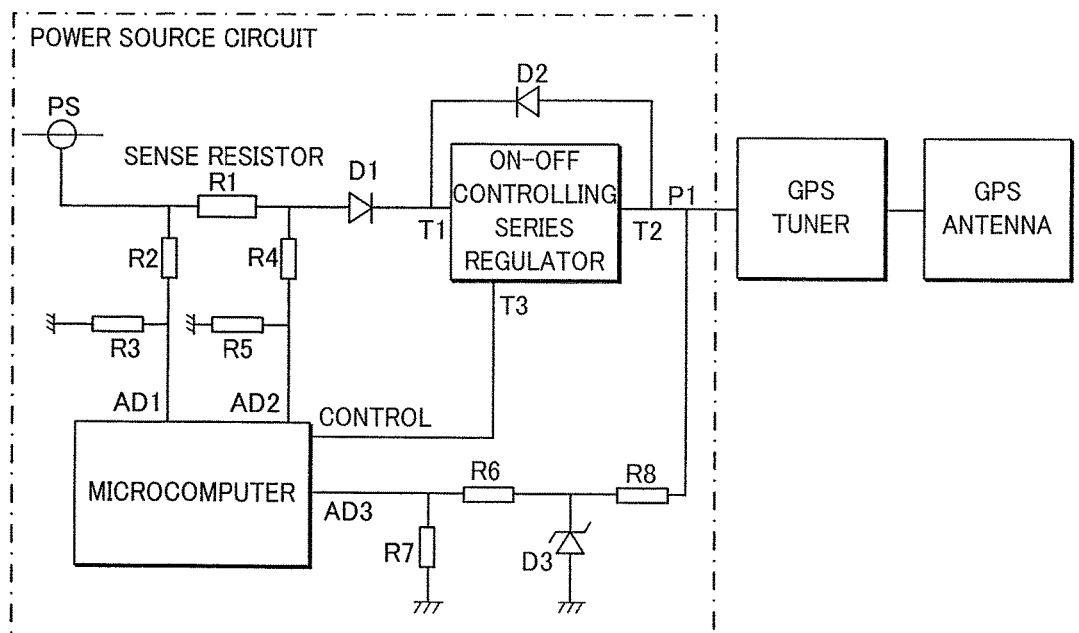
FIG. 5 is a diagram showing an example of a configuration of a conventional power supply apparatus including an open-circuit detection function and a short-circuit detection function.

FIG. 4 shows a regulator IC of the second modification. According to the present modification, the short-circuit abnormality detecting comparator 17 as described in the embodiment shown in FIG. 1 can also serve as the comparator as the current limit circuit 14. Therefore, in this case, the current mirror transistor Q3 to flow a monitoring current to detect the short-circuit abnormality can also serve as the current mirror transistor Q4 to flow a monitoring current of the current limit circuit 14.

Specifically, the current mirror transistor Q4 and the external terminal P2 shown in FIG. 1 are omitted, and the internal resistor R4 which converts the current of the current mirror transistor Q3 to voltage is provided. The voltage converted in the resistor R4 is input to the non-inverted input terminal of the short-circuit abnormality detecting comparator 17. The output of the comparator 17 and the output of the thermal shutdown circuit 15 are input in the base terminal of the transistor Q6 for output through the OR gate 18.

The output of the comparator 17 is applied to the base terminal of the voltage controlling transistor Q1 and the current mirror transistors Q2 and Q3 through the inverters 23 and 24. When a current equal to or larger than a predetermined current value flows in the voltage controlling transistor Q1 the current of the voltage controlling transistor Q1 is clamped and the output current Iout is limited.

According to the regulator IC of the second modification, compared to the regulator IC of the first embodiment, the configuration can be made with one less external terminal and the short-circuit abnormality detecting circuit can also serve as the current limit circuit. With this, it is possible to make the chip smaller.

Alternatively, the following configuration is possible. The short-circuit abnormality detecting comparator 17 can also serve as the current limit circuit 14, and the external terminal P2 can be provided to connect the resistor R4 as the external resistor in order to adjust the detecting current value (threshold).

The invention is specifically described according to the embodiments, but the present invention is not limited to the above-described embodiments. For example, according to the present embodiment, the bipolar transistor is used as the voltage controlling transistor Q1 and the current mirror transistors Q2 to Q4, but instead of the bipolar transistor, MOSFET can be used.

According to the present embodiment, the breeder resistors R1 and R2 are provided inside the chip to divide the output voltage, but a dividing circuit including an external resistor can be provided, and the voltage divided outside of the chip can be input to the error amplifier 11 from the external terminal.

Effective ways of using the serial power source apparatus applying the series regulator of the present embodiment include electronic devices in vehicles such as car navigation devices, ETC devices, audio devices and antenna devices for cars. Alternatively, the present invention can be used in any system including a load which operates with a DC power source.

In order to achieve at least one of the above-described objects, according to an aspect of the present invention, there is provided a semiconductor integrated circuit for a regulator including: a voltage controlling transistor which is connected between a voltage input terminal in which DC voltage is input and an output terminal; a controlling circuit which controls the voltage controlling transistor according to a feedback voltage of an output; a first transistor and a second transistor which are provided parallel to the voltage controlling transistor and in which a current in a proportional reduction from a current flowing in the voltage controlling transistor flows; a first external terminal to connect a current voltage converting element which converts current flowing in the first transistor to voltage; a first voltage comparing circuit which compares a voltage converted by the current voltage converting element with a predetermined comparison voltage and determines which is large or small; a second voltage comparing circuit which compares a voltage converted from a current flowing in the second transistor with a predetermined comparison voltage and determines which is large or small; a first output terminal which externally outputs a result of comparison by the first voltage comparing circuit; and a second output terminal which externally outputs a result of comparison by the second voltage comparing circuit, wherein, when a current larger than a predetermined open-circuit abnormality detecting current value flows in the first transistor, output of the first voltage comparing circuit is inverted; and when a current larger than a predetermined short-circuit abnormality detecting current value flows in the second transistor, output of. the second voltage comparing circuit is inverted.

According to the semiconductor integrated circuit for the regulator as described above, the abnormalities such as the open-circuit and the short-circuit of the load connected to the output terminal are detected based on the current in proportion with the current flowing in the voltage controlling transistor instead of using the sense resistor for detecting the output current. Therefore, the open-circuit abnormality can be accurately detected compared to the method providing the sense resistor with the low resistance in the input terminal. Since the open-circuit and the short-circuit of the load is determined and a detecting signal is output externally in the semiconductor integrated circuit for the regulator, the burden of the controlling apparatus (CPU) such as the micro-computer controlling the system can be reduced. Since an external terminal to connect the element (resistor) which converts the current in proportion with the current flowing in the voltage controlling transistor to voltage is provided, the current which is to be the reference for determining the abnormality (open-circuit) can be set freely and accurately according to the system.

Preferably, the semiconductor integrated circuit for the regulator further includes a thermal shutdown circuit which detects a temperature of a semiconductor substrate forming the semiconductor integrated circuit and turns off the voltage controlling transistor with the controlling circuit when the temperature of the semiconductor substrate increases to a temperature equal to or larger than a predetermined temperature set in advance, wherein, a signal of a logical sum between an output of the thermal shutdown circuit and an output of the second voltage comparing circuit can be output from the second output terminal as a short-circuit abnormality detecting signal.

According to the above configuration, the signal of the logical sum between the output of the thermal shutdown circuit and the output of the second voltage comparing circuit is output as the short-circuit abnormality detecting signal from the second output terminal, and the detecting and release of the short-circuit being repeated and a plurality of detecting pulses in the detecting signal can be avoided.

Preferably, the semiconductor integrated circuit for the regulator further includes a delay circuit which delays output of at least the second voltage comparing circuit among the output of the first voltage comparing circuit and the second voltage comparing circuit, wherein, a signal obtaining a logical product of an output signal of the second voltage comparing circuit and a signal delayed in the delay circuit can be output from the second output terminal as a short-circuit abnormality detecting signal.

According to the above configuration, it is possible to prevent the short-circuit abnormality detecting signal from being output due to the rush current flowing toward the condenser connected to the output terminal at the start of operation.

Preferably, the semiconductor integrated circuit for the regulator further includes a second external terminal to connect a current voltage converting element to convert current flowing in the second transistor to voltage, wherein, the second voltage comparing circuit compares the voltage converted by the current voltage converting element connected to the second external terminal with a predetermined comparison voltage.

According to the above configuration, the current value which is to be the reference for determining the short-circuit abnormality can be set freely and accurately according to the system.

Preferably, the semiconductor integrated circuit for the regulator further includes a current limit circuit to limit an output current so that an output current equal to or more than a predetermined current value does not flow, wherein, the current limit circuit limits a current flowing in the voltage controlling transistor when the output current based on the output of the second voltage comparing circuit is equal to or more than a predetermined current value.

According to the above configuration, since the current limit circuit and the circuit detecting short-circuit abnormality can also be employed as the transistor (current mirror transistor) generating the current for monitoring and some of the other circuits (comparator, etc.), the elements composing the circuit can be decreased. Moreover, it is possible to decrease the number of external terminals connecting the current-voltage conversion element, and the chip size can be made smaller.

The embodiments described above of the present invention should be construed for mere illustrative purposes, not for limitation. The present invention is not limitedly applied to the above-described embodiments, and appropriate modifications or alterations of the invention can be made within the scope without departing from the spirit of the invention.

This application is based upon and claims the benefit of priority from the prior Japanese Patent Application No. 2015-164596, filed Aug. 24, 2015, the entire contents of which are incorporated herein by reference.

What is claimed is:
1. A semiconductor integrated circuit for a regulator comprising:
   a voltage controlling transistor which is connected between a voltage input terminal in which DC voltage is input and an output terminal;
   a controlling circuit which controls the voltage controlling transistor according to a feedback voltage of an output;
   a first transistor and a second transistor which are connected in parallel to the voltage controlling transistor, wherein a current in a proportional reduction from a current flowing in the voltage controlling transistor flows in the first transistor and the second transistor;
   a first external terminal which connects to a first current voltage converting element which converts the current flowing in the first transistor to a voltage;

a first voltage comparing circuit which compares the voltage converted by the first current voltage converting element with a predetermined comparison voltage;

a second external terminal which connects to a second current voltage converting element which converts the current flowing in the second transistor to a voltage;

a second voltage comparing circuit which compares the voltage converted by the second current voltage converting element with the predetermined comparison voltage;

a first output terminal which externally outputs a result based on the comparison by the first voltage comparing circuit; and a second output terminal which externally outputs a result based on the comparison by the second voltage comparing circuit, wherein:

when a current larger than a predetermined open-circuit abnormality detecting current value flows in the first transistor, an output of the first voltage comparing circuit is inverted; and when a current larger than a predetermined short-circuit abnormality detecting current value flows in the second transistor, an output of the second voltage comparing circuit is inverted.

2. The semiconductor integrated circuit for the regulator of claim 1, further comprising a thermal shutdown circuit which detects a temperature of a semiconductor substrate of the semiconductor integrated circuit, wherein the thermal shutdown circuit turns off the voltage controlling transistor with the controlling circuit when the temperature of the semiconductor substrate increases to a temperature equal to or larger than a predetermined temperature, wherein a signal based on a logical sum between an output of the thermal shutdown circuit and the output of the second voltage comparing circuit is output from the second output terminal as a short-circuit abnormality detecting signal.

3. The semiconductor integrated circuit for the regulator of claim 1, further comprising a delay circuit which delays the output of at least the second voltage comparing circuit among the output of the first voltage comparing circuit and the output of the second voltage comparing circuit, wherein a signal based on a logical product between the output of the second voltage comparing circuit and a signal delayed in the delay circuit is output from the second output terminal as a short-circuit abnormality detecting signal.

4. The semiconductor integrated circuit for the regulator of claim 1, further comprising a current limit circuit to limit an output current so that an output current equal to or more than a predetermined current value does not flow, wherein the current limit circuit limits a current flowing in the voltage controlling transistor when an output current based on the output of the second voltage comparing circuit is equal to or more than the predetermined current value.

* * * * *